J. F. O'CONNOR.
HAND BRAKE.
APPLICATION FILED AUG. 23, 1918.

1,403,187.
Patented Jan. 10, 1922.

Inventor
John F. O'Connor
By George I. Haight
Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

HAND BRAKE.

1,403,187. Specification of Letters Patent. Patented Jan. 10, 1922.

Application filed August 23, 1918. Serial No. 251,075.

*To all whom it may concern:*

Be it known that I, JOHN F. O'CONNOR, a citizen of the United States, residing at Chicago, in the county of Cook and State of Illinois, have invented a certain new and useful Improvement in Hand Brakes, of which the following is a full, clear, concise, and exact description, reference being had to the accompanying drawings, forming a part of this specification.

My invention relates to improvements in hand brakes.

Figure 1:
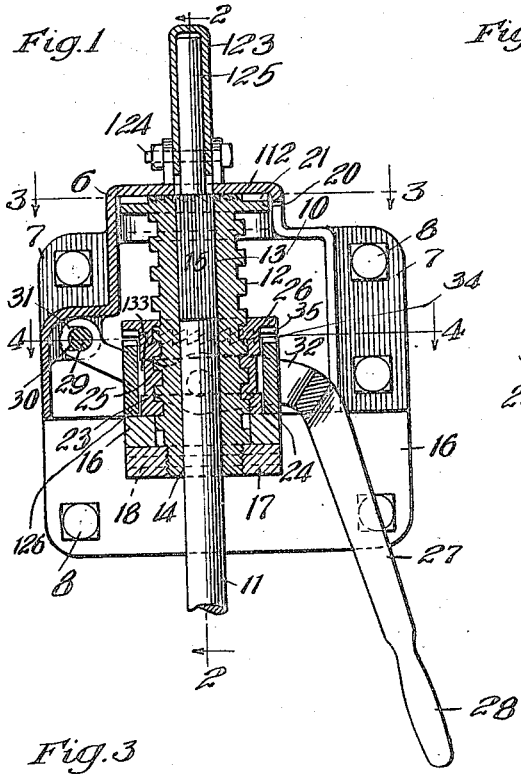
Figure 2:
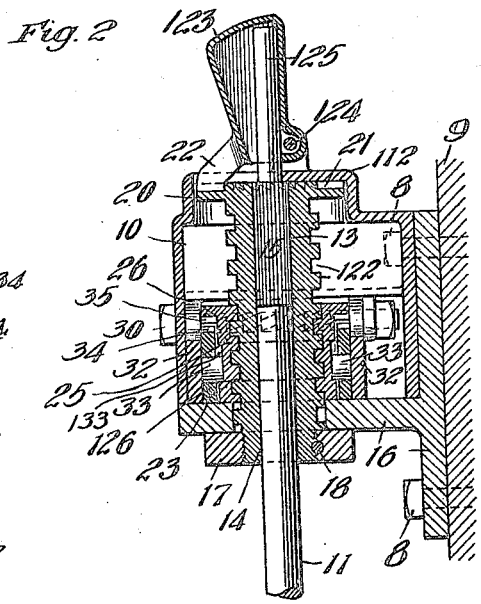
Figure 3:
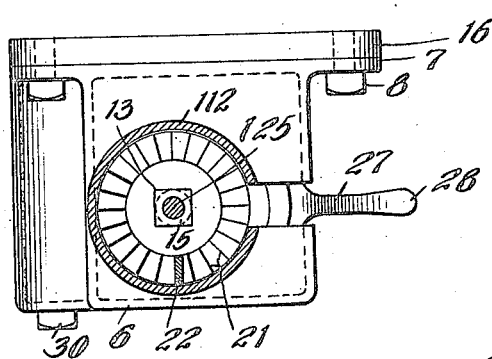
Figure 4:
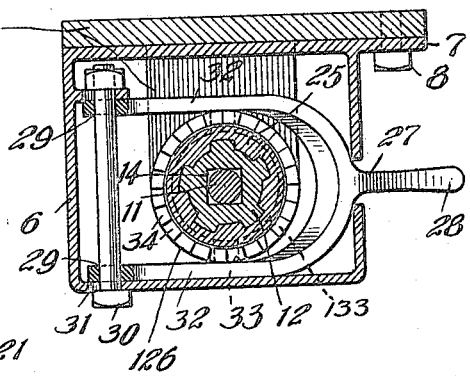
Figure 5:
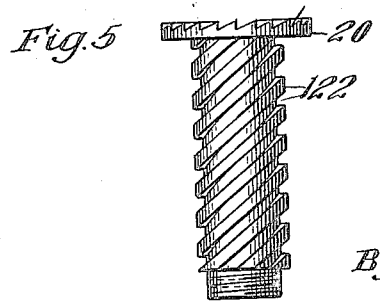

In the form of my invention illustrated in the drawings, there is shown a hand brake especially adapted for use upon railway cars. In the said drawings, Fig. 1 is a longitudinal, vertical section of a hand brake embodying my invention, Fig. 2 is a vertical, transverse section taken on line 2—2 of Fig. 1, Fig. 3 is a cross section taken on line 3—3 of Fig. 1, Fig. 4 is a cross section taken on line 4—4 of Fig. 1 and Fig. 5 is a front elevation view of the worm comprising a part of the device.

Referring to the drawings, the numeral 6 indicates a casing or housing in which the principal operating parts of the brake are received. The said housing is provided with suitable flanges 7—7, perforated to receive the bolts 8—8, by means of which the housing is secured to the end of a car 9. The housing contains a chamber 10 through which the brake staff 11 passes, the said brake staff extending at its upper end through the top wall 112 of the housing. Within the chamber 10 there is mounted upon the brake staff 11 the worm 12, which is secured against rotation on the shaft by the engagement of the non-circular portion 13 of the perforation 14 through which the brake staff extends upon the non-circular portion 15 of the brake staff, the said non-circular portions in the structure shown in the drawing being of substantially square conformation. Near its lower end, the worm is journaled in the bracket 16 and the said worm is provided at its lower end with a retaining washer 17, which is held against accidental displacement by the pin 18 passing through registering perforations in the nut and the worm. At its upper end, the worm is provided with a flange 20, and on its upper surface is formed with the ratchet teeth 21, which are adapted to be engaged by the locking pawl 22, the said locking or retaining pawl being provided with a hollow handle 123 which is pivoted, as at 124, to the bracket and encloses the upper end 125 of the brake staff 11, thus forming a hand-hold for the operator as well as a handle for the locking or retaining pawl. The worm 12 is provided upon its periphery with the helical grooves and teeth 122, which are engaged by the interiorly formed grooves 23 and teeth 24 of the operating nut 25, which interengage with the teeth and grooves of the worm. The said operating nut 25 is provided, at its upper end, with an outwardly extending flange 26, which is adapted to engage the flange at the upper end of the worm and thus limit the upward travel of the nut when the device is operated, as hereinafter described. The operating nut 25 is mounted within a collar or band 126, the said collar being associated with an operating lever 27 having a handle 28 at its outer end and a bifurcated inner end pivoted to the casing at its fulcrum point 29 by a pin or bolt 30, which operates in a slightly elongated opening 31 to permit the pump-handle action of the lever hereinafter referred to. The bifurcated arms of the lever 27 are indicated at 32—32. Said arms 32—32 are provided on their inner faces with lugs or bosses 33 which pass through corresponding circular openings in the collar 126 and also into an annular groove 133 formed in the nut 25.

In order to operate the brake and wind up the brake chain (the latter not being shown but understood to be wound on the lower end of the staff 11) the operator moves the lever 27 up and down. Upward movement of the lever 27 will lift the collar 126 until the teeth 34 on the top thereof engage the cooperating teeth 35 on the under side of the flange 26 of the nut 25. In this connection, it will be understood that the annular groove 133 in the nut 25 is of sufficient vertical height to accommodate this relative movement between the collar 126 and the nut 25. After the teeth 34 and 35 have been thus engaged, continued upward movement of the lever 27 will obviously raise the nut 25 but without rotation of the latter so that the staff 11 will be positively rotated due to the threaded engagement between the nut and the staff. Such upward movement of the lever 27 may be continued until the flange 26 engages the flange 20. Obviously after the staff is rotated, it will be held by the locking dog 22.

When the handle 27 is next lowered, the collar 126 will fall downwardly at first so as to disengage the teeth 34 and 35 and as continued downward movement of the lever and collar occurs, the nut 25 will be pulled down by the lugs 33 engaging the bottom edge of the groove 133 therein. However, during the downward movement of the nut 25 the nut will be free to rotate without imparting any rotating movement to the staff. Repetition of the upward movement of the lever 27 will cause further rotation of the staff as will be evident and the downward action can be repeated.

During the pump handle action of the lever, as above described, it is evident that the operator may use one hand to actuate the lever and with the other can grasp the handhold 123 if he desires or some suitable part of the car. The staff can be released entirely by disengaging the locking pawl or dog 22, as will be evident, but if the brakeman desires to gradually ease off the brake chain, he may readily do so by disengaging the locking dog 22 when the lever, collar and nut are in their uppermost position and the collar and nut in clutched engagement. By lowering the lever gradually while the collar and nut are thus in clutched engagement, it is evident that the reversed rotation or release movement of the staff 11 can be graduated.

I claim:

1. In a device of the character described, the combination with a member to be rotated, and means for rotatably supporting said member and holding the same against longitudinal movement, of an actuating element movable longitudinally of said member and having threaded engagement therewith, manually operated means for imparting longitudinal nonrotative movement to said element in one direction to thereby impart rotative movement in one direction to said member, means for holding said member against accidental rotation in the reverse direction, and means permitting combined rotation and longitudinal movement under manual control in the opposite direction of said element.

2. In a device of the character described, the combination with a vertical brake staff adapted for rotation, and means for rotatably supporting said staff and holding the same against longitudinal movement, of an actuating element vertically movable relatively to said staff and having threaded engagement therewith, means, freely movable into operative engagement with said element, for imparting vertical up and down movement to said element relatively to the staff, and means for preventing rotation of said element when moved vertically in one direction, said last named means being rendered inoperative when the element is moved in the opposite direction to thereby permit said element to rotate when moving vertically in said opposite direction.

3. In a brake, in combination, a staff, a worm upon the staff, an operating nut for said worm, a lever to move the nut upon the worm and a holding pawl, the worm being provided with teeth adapted to be engaged by the holding pawl.

4. In a brake, in combination, a housing, a staff upwardly extended through said housing, operating mechanism for said staff, a holding pawl for said mechanism, the said holding pawl having a hollow handle mounted over the end of the staff and pivotally secured to the housing.

5. In a brake, a staff, a bracket adapted to hold the staff, operating mechanism associated with said staff, a hand-hold upon said brake, the hand-hold enclosing one end of the staff and being pivotally connected to the bracket, the said hand-hold being provided with a holding pawl for the operating mechanism.

6. In a brake, in combination, a housing, a staff passing through said housing, a worm within said housing mounted upon the staff, an operating nut associated with the worm, a lever pivotally connected to the housing, a collar having a toothed engagement with the nut and a pivotal connection with the lever, and a holding pawl for the worm, the holding pawl having a hollow handle enclosing the end of the staff and pivotally connected to the housing, the worm being provided with teeth adapted to be engaged by the holding pawl.

7. In a brake for railway cars and the like, the combination with a vertical brake staff; of a worm secured to said staff and held against rotation with respect thereto; a nut mounted on said worm and slidable lengthwise thereof; a collar on said nut adapted for a limited amount of movement freely lengthwise of said nut; co-operating means on said nut and collar adapted to lock the same against relative rotation when the collar is shifted in one direction lengthwise of the nut; manually operable means for shifting said collar into locking engagement with said nut; and releasable means for holding said staff against rotation in an unwinding direction.

In witness that I claim the foregoing I have hereunto subscribed my name this 19th day of Aug. 1918.

JOHN F. O'CONNOR.